United States Patent
Yamada et al.

(10) Patent No.: US 10,376,976 B2
(45) Date of Patent: Aug. 13, 2019

(54) ELECTRODE FOR ELECTRICAL DISCHARGE MACHINING AND METHOD FOR MANUFACTURING HONEYCOMB STRUCTURE FORMING DIE

(71) Applicant: NGK Insulators, Ltd., Nagoya (JP)

(72) Inventors: Takuya Yamada, Nagoya (JP); Takayuki Onizuka, Abashiri (JP); Hirotaka Henmi, Abashiri (JP)

(73) Assignee: NGK Insulators, Ltd., Nagoya (JP)

( * ) Notice: Subject to any disclaimer, the term of this patent is extended or adjusted under 35 U.S.C. 154(b) by 318 days.

(21) Appl. No.: 14/921,246

(22) Filed: Oct. 23, 2015

(65) Prior Publication Data

US 2016/0039026 A1    Feb. 11, 2016

Related U.S. Application Data

(63) Continuation of application No. PCT/JP2015/057809, filed on Mar. 17, 2015.

(30) Foreign Application Priority Data

Mar. 28, 2014 (JP) ................. 2014-068216

(51) Int. Cl.
*B23H 1/04* (2006.01)
*B23H 9/00* (2006.01)
*B28B 3/26* (2006.01)

(52) U.S. Cl.
CPC ............ *B23H 1/04* (2013.01); *B23H 9/00* (2013.01); *B23H 2200/30* (2013.01); *B28B 3/269* (2013.01)

(58) Field of Classification Search
CPC ........ B23H 1/04; B23H 2200/30; B28B 3/269
(Continued)

(56) References Cited

U.S. PATENT DOCUMENTS 3,607,689 A * 9/1971 Inoue ................ B23H 3/02
                                                 204/224 M
7,335,848 B2 * 2/2008 Hironaga ............. B23H 9/00
                                                 219/69.14
(Continued)

FOREIGN PATENT DOCUMENTS

JP    2005-254345 A1    9/2005
JP    2010-247536 A1    11/2010
(Continued)

OTHER PUBLICATIONS

Extended European Search Report (Application No. 15770360.4) dated Oct. 4, 2016.
(Continued)

*Primary Examiner* — Brahime A Abraham
*Assistant Examiner* — John J Norton
(74) *Attorney, Agent, or Firm* — Burr & Brown, PLLC (57) ABSTRACT

An electrode for electrical discharge machining which makes it possible to form slits of a honeycomb structure forming die so that a slit width on a front surface side is smaller than a slit width on a back hole side is provided. The electrode for electrical discharge machining includes: plural plate-shaped discharge portions with a thickness that is gradually increased toward tips thereof; and a plate-shaped support portion to which end portions of the plural discharge portions on a side opposite to the tips are connected, wherein a difference between a thickness of the tip; and a thickness of the end portion on the side opposite to the tip ranges from 5 µm to 500 µm in the discharge portion.

13 Claims, 8 Drawing Sheets (58) Field of Classification Search
USPC .......................................... 219/69.17, 69.15
See application file for complete search history.

(56) References Cited

U.S. PATENT DOCUMENTS

| | | | |
|---|---|---|---|
| 7,572,997 B2* | 8/2009 | Kao | B23H 1/02 |
| | | | 205/665 |
| 9,630,268 B2* | 4/2017 | Rudgley | B23H 1/04 |
| 2005/0198822 A1 | 9/2005 | Hironaga et al. | |
| 2008/0203069 A1 | 8/2008 | Kao et al. | |
| 2010/0244309 A1 | 9/2010 | Hayashi et al. | |
| 2011/0233186 A1 | 9/2011 | Hayashi et al. | |

FOREIGN PATENT DOCUMENTS

| | | |
|---|---|---|
| JP | 5097234 B2 | 12/2012 |
| WO | 2012/097187 A2 | 7/2012 |

OTHER PUBLICATIONS

International Search Report and Written Opinion (Application No. PCT/JP2015/057809) dated Jun. 23, 2015.

* cited by examiner

ELECTRODE FOR ELECTRICAL DISCHARGE MACHINING AND METHOD FOR MANUFACTURING HONEYCOMB STRUCTURE FORMING DIE

BACKGROUND OF THE INVENTION

Field of the Invention

The present invention relates to an electrode for electrical discharge machining and a method for manufacturing a honeycomb structure forming die. Further in detail, the present invention relates to an electrode for electrical discharge machining and a method for manufacturing a honeycomb structure forming die, which makes it possible to form a slit of the honeycomb structure forming die so that a slit width on a front surface side is smaller than a slit width on a back hole side.

DESCRIPTION OF RELATED ART

Conventionally, a honeycomb structure forming die has been produced by, for example, forming plural back holes that are opened on one face (a back surface) side of a metal plate member, and further forming slits that are opened on the other face (a front surface) side and are in communication with the back holes. At this time, in the case where each of the slits that are formed on the front surface of the plate member are formed so as to be extended linearly while crossing another slit on the front surface, the slits can be formed by grinding work. For example, this is possible for a honeycomb structure forming die for producing a square cell honeycomb structure corresponds to this case. In the present specification, the honeycomb structure means a ceramic honeycomb structure. Moreover, in the present specification, the honeycomb structure forming die may be called solely as a "die".

However, for example, in a die for forming an hexagonal cell honeycomb structure, when one linear slit (which corresponds to one side of the hexagon) is extended on a front surface of the die, it passes through a "region in which no slit is formed (region inside the hexagon)" on the front surface. The die with such a structure has been difficult to be produced by grinding work.

Accordingly, for example, when producing a die for forming such an hexagonal cell honeycomb structure, such slits are formed by electrical discharge machining using a comb teeth-shaped electrode for electrical discharge machining (see, for example, Patent Documents 1 and 2).

CITATION LIST

Patent Documents

[Patent Document 1] JP-A-2005-254345
[Patent Document 2] JP-B-5097234

SUMMARY OF THE INVENTION

Problem to be Solved by the Invention

As shown in Patent Documents 1 and 2, in a conventional electrode for electrical discharge machining (a comb electrode), discharge portions, which form slits while discharging electricity and correspond to comb teeth, have plate shapes with a uniform thickness. Further, tips of the discharge portions are consumed by their use, so that the discharge portion comes to have a shape that a thickness of the tip is smaller than a thickness of an "end portion on a side opposite to the tip" (an end portion that is connected to a support portion), that is, a taper shape whose thickness is decreased toward the tip.

As described above, when the discharge portion of the electrode for electrical discharge machining has the taper shape with such a thin tip, the slit formed by the processing using the electrode for electrical discharge machining comes to have a shape that a width of an open end which is opened on a front surface of the plate member is the largest, and is gradually decreased toward an inside of a plate member.

When performing extrusion molding by using a die in which plural slits and plural back holes that are in communication with the slits are formed, raw materials are inserted from the back holes; inflow into the slits; and are ejected from the open ends of the slits that are opened on a front surface of the die (a front surface of the plate member). Thereby, a formed body is formed. At this time, if the extrusion molding is performed by using the above-described die having the slits with the shape that the width of the open end is large and is gradually decreased toward the inside, foreign substances in the raw materials are sometimes clogged at parts entering into the slits from the back holes (the end portions of the slits on the back hole side). The reason for this is because the parts where the parts entering into the slits from the back holes (the end portions of the slits on the back hole side) are the narrowest parts in the slits. Incidentally, hereinafter, the open end of the slit that is opened on the front surface of the die (the front surface of the plate member) may be called solely as an "open end".

Further, since the die produced by using the conventional electrode for electrical discharge machining has the narrow "end portions of the slits on the back hole side", resistance for performing the extrusion molding is sometimes high.

The present invention is made in view of the above-described problems. The present invention provides an electrode for electrical discharge machining and a method for manufacturing a honeycomb structure forming die, which makes it possible to form a slit of the honeycomb structure forming die so that a slit width on a front surface side is smaller than a slit width on a back hole side.

Means for Solving the Problem

In order to solve the above-described problems, the present invention provides an electrode for electrical discharge machining and a method for manufacturing a honeycomb structure forming die as follows.

[1] An electrode for electrical discharge machining, including: plural plate discharge portions with a thickness that is increased toward tips thereof, which are parallel with each other; and a plate support portion to which end portions of the plural discharge portions on a side opposite to the tips are connected.

[2] The electrode for electrical discharge machining according to [1], wherein a difference between a thickness of each tip of the discharge portions and a thickness of each end portion of the discharge portions on the side opposite to the each tip of the discharge portions ranges from 5 μm to 500 μm.

[3] The electrode for electrical discharge machining according to [1] or [2], wherein a thickness of each tip of the discharge portions ranges from 50 μm to 1000 μm.

[4] The electrode for electrical discharge machining according to any one of [1] to [3], wherein the plate discharge portions are arranged at an interval in a width direction.

[5] A method for manufacturing a honeycomb structure forming die, including: a back hole forming step for forming plural back holes which are opened on a back surface side that is one face of a metal plate member; and a slit forming step for forming slits which are opened on a front surface side that is the other face of the metal plate member and are in communication with the back holes so as to produce a honeycomb structure forming die, wherein the slit forming step includes: forming slit-shaped through-holes, which are opened on the front surface side and are in communication with the back holes, in the plate member by an electrode for electrical discharge machining for penetration processing; subsequently inserting the discharge portions of the electrode for electrical discharge machining according to any one of [1] to [4] into the through-holes while the discharge portions discharge electricity; and thereafter processing inside of the through-holes by reciprocating the discharge portions of the electrode for electrical discharge machining in a direction of each thickness of the discharge portions while the discharge portions discharge electricity in the through-holes, to form the slits in which each opening width of the slits on the back hole side is larger than each opening width of the through-holes on the front surface side.

[6] The method for manufacturing a honeycomb structure forming die according to [5], wherein the slits are formed not in a continuous linear manner on the front surface of the honeycomb structure forming die.

[7] The method for manufacturing a honeycomb structure forming die according to [6], wherein a shape formed of the slits on the front surface of the honeycomb structure forming die is a hexagon or a combination of a square and an octagon.

Effect of the Invention

According to the electrode for electrical discharge machining of the present invention, since the discharge portion becomes gradually thicker toward the tip and the tip portion is the thickest, the slit of the honeycomb structure forming die can be formed so that the slit width on the front surface side is smaller (narrower) than the slit width on the back hole side.

According to the method for manufacturing the honeycomb structure forming die of the present invention, since the honeycomb structure forming die is produced by using the electrode for electrical discharge machining of the present invention, the slit can be formed so that the slit width on the front surface side is smaller than the slit width on the back hole side.

DETAILED DESCRIPTION OF THE INVENTION

Hereinafter, embodiments of the present invention will be described with reference to the drawings. The present invention is not limited to the following embodiments. It should be understood that modification, improvement and the like can be added appropriately to the embodiments on the basis of the ordinary knowledge of a person skilled in the art, without departing from the gist of the invention.

(1) Electrode for Electrical Discharge Machining

Figure 1:
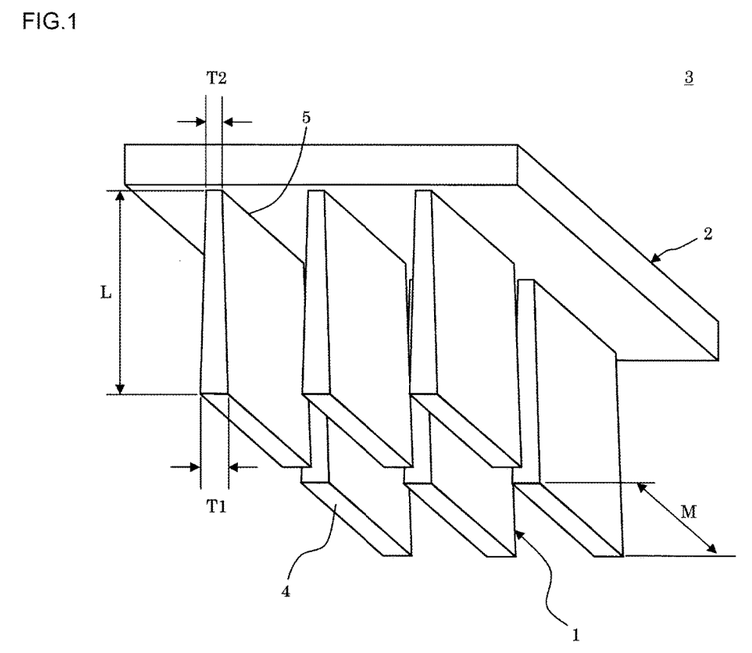
FIG. 1 is a perspective view that schematically shows one embodiment of an electrode for electrical discharge machining of the present invention.
Figure 2:
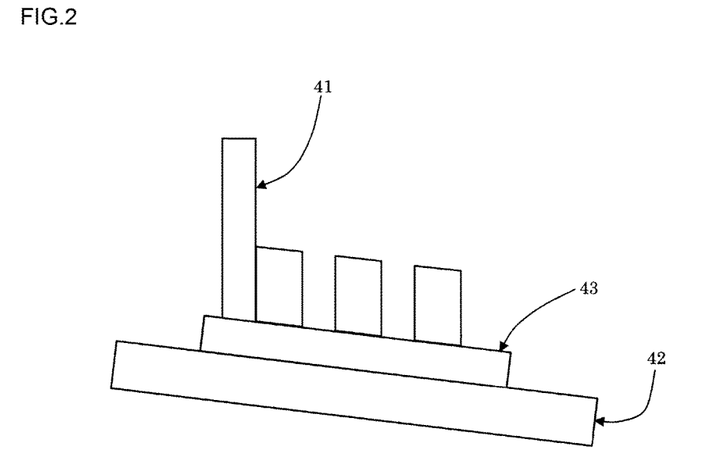
FIG. 2 is a schematic diagram that shows a state of polishing the electrode forming substrate in a method for producing one embodiment of the electrode for electrical discharge machining of the present invention.
Figure 3:
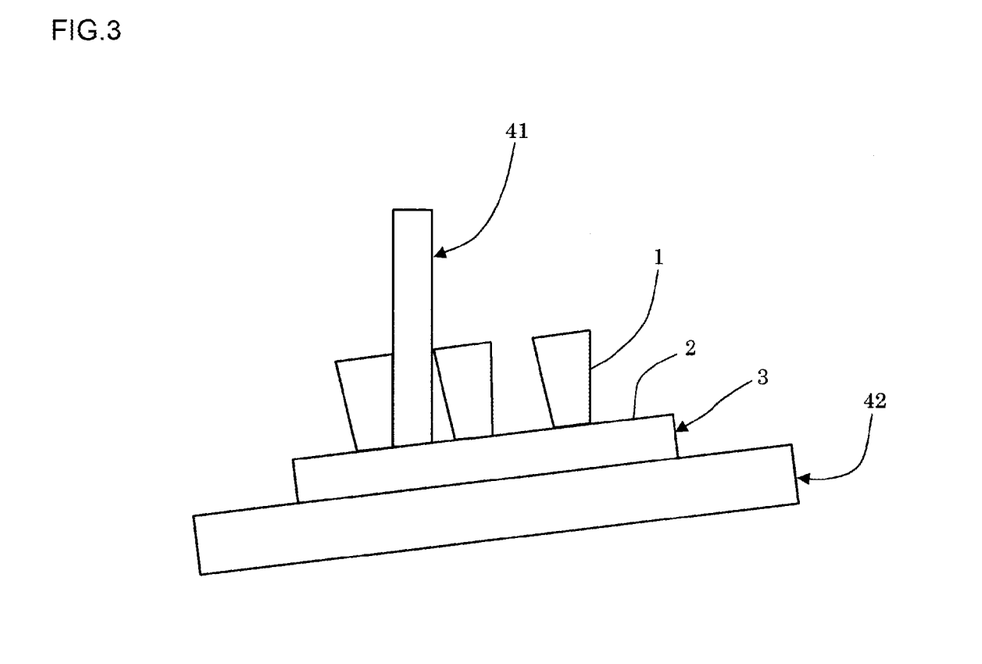
FIG. 3 is a schematic diagram that shows a state of polishing the electrode forming substrate in a method for producing one embodiment of the electrode for electrical discharge machining of the present invention.

One embodiment of the electrode for electrical discharge machining of the present invention will be described. FIG. 1 is a perspective view that schematically shows one embodiment of the electrode for electrical discharge machining 3 of the present invention. FIG. 2 is a schematic diagram that shows a state of polishing the plate material for forming an electrode in a method for producing one embodiment of the electrode for electrical discharge machining of the present invention. FIG. 3 is a schematic diagram that shows a state of polishing the plate material for forming an electrode in a method for producing one embodiment of the electrode for electrical discharge machining of the present invention.

As shown in FIG. 1, the electrode for electrical discharge machining 3 of the present embodiment includes: "plural" plate-shaped discharge portions 1 that are "parallel with each other", with a thickness that is gradually increased toward tips 4; and a plate-shaped support portion 2 to which end portions 5 of the plural discharge portions 1 "on a side opposite to the tips 4" are connected. The shape with "a thickness that is gradually increased toward the tip 4" can also be expressed as a "taper shape with the thick tip 4". Incidentally, the "plural plate-shaped discharge portions that are parallel with each other" means that the plural plate-shaped discharge portions 1 are disposed so that their respective tips 4 may be arranged in parallel with each other, as shown in FIG. 1.

As described above, in the electrode for electrical discharge machining 3 of the present embodiment, the discharge portion 1 has the "taper shape with the thick tip 4". Thus, when producing a slit of the a honeycomb structure forming die, a width of an open end of the slit can be formed to be smaller than a width of the slit (a width of a part that is in communication with a back hole) on the back hole side (a molding raw material introduction side). Then, if the width of the open end of the slit is made smaller than the width of the slit on the back hole side, foreign substances in the molding raw materials can be prevented from being clogged at a part entering into the slit from the back hole. Further, increase in the resistance for performing the extrusion molding can also be suppressed.

In the electrode for electrical discharge machining 3 of the present embodiment, the discharge portion 1 has a plate shape having "taper shape with the thick tip 4". A difference between a thickness T1 of the tip 4 and a thickness T2 of the "end portion 5 on the side opposite to the tip 4" preferably ranges from 5 μm to 500 μm.

In the electrode for electrical discharge machining 3 of the present embodiment, the thickness T1 of the tip 4 of the discharge portion 1 preferably ranges from 50 μm to 1000 μm.

In the electrode for electrical discharge machining 3 of the present embodiment, a length L of the discharge portion 1 ranges, for example, from 1 μm to 5 mm.

Figure 8:
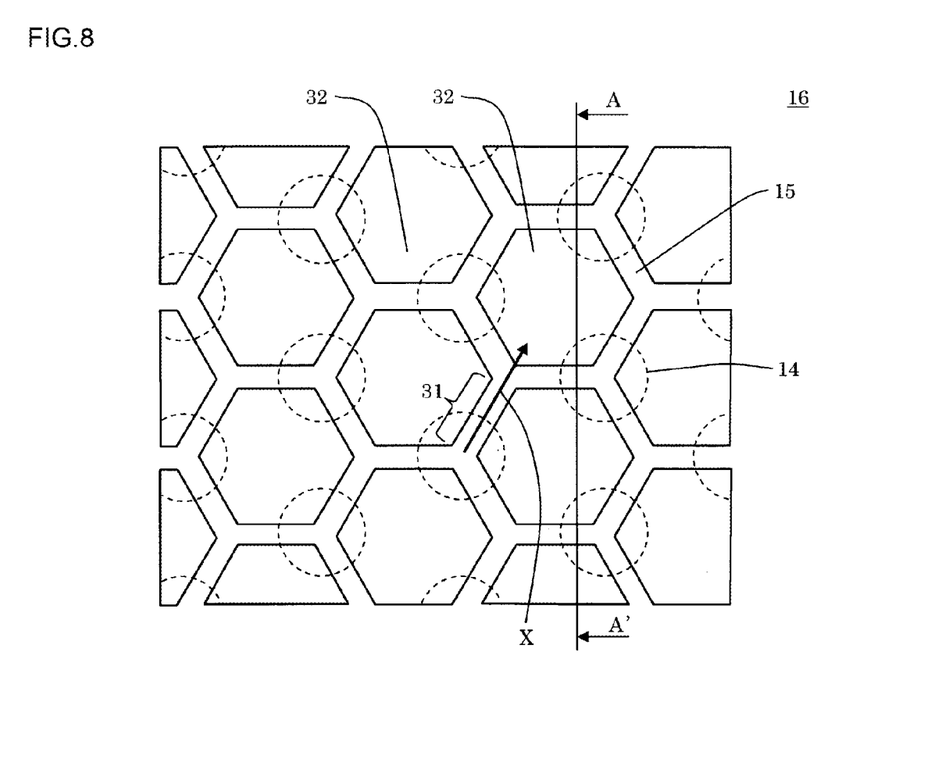
FIG. 8 is a plan view that schematically shows a part of a honeycomb structure forming die, which is manufactured according to one embodiment of the method for manufacturing a honeycomb structure forming die of the present invention.

In the electrode for electrical discharge machining 3 of the present embodiment, a length M of the tip 4 of the discharge portion 1 preferably ranges from 0.5 mm to 3 mm. For example, in the case where hexagonal patterns are formed of the open ends of the slits on a front surface of the die as shown in FIG. 8, the length M of the tip 4 of the discharge portion 1 shown in FIG. 1 is approximately a "length of one side of the hexagon" preferably. The length M of the tip 4 of the discharge portion 1 is a length in a "direction that perpendicularly crosses a thickness direction" of the tip 4 of the discharge portion 1. FIG. 8 is a plan view that schematically shows a part of the honeycomb structure forming die, which is manufactured by one embodiment of the method for manufacturing a honeycomb structure forming die of the present invention.

In the electrode for electrical discharge machining 3 of the present embodiment, intervals of the plural discharge portions 1 in the thickness direction are not limited particularly, and can be determined according to intervals of the slits which are to be produced. The plural discharge portions 1 are arranged at intervals in the thickness direction on one face of the plate-shaped support portion 2. A size of a region (an area) in the support portion 2 in which the plural discharge portions 1 are disposed is not limited particularly, but is preferably set to be, for example, a size that can cover a whole region for forming the slits of the die to be produced. Also, the size of the region (the area) in the support portion 2 in which the plural discharge portions 1 are disposed may be a size that can cover a half of the region for forming the slits of the die to be produced. Moreover, the plural discharge portions 1 are preferably arranged at intervals in a width direction (a direction that perpendicularly cross both of a length direction and the thickness direction). Incidentally, the "thickness" of the discharge portion 1 corresponds to the "width" of the slit, and the "width" of the discharge portion 1 corresponds to the "length (for example, one side of the hexagon)" of the slit.

In the electrode for electrical discharge machining 3 of the present embodiment, respective faces of the plate-shaped discharge portion 1 (an end face of the tip 4, the front surface, a back surface and two long and narrow side faces) are preferably planar.

In the electrode for electrical discharge machining 3 of the present embodiment, a thickness of the support portion 2 is not limited particularly, and is preferably set to be a thickness that is appropriate for the use as the electrode.

In the electrode for electrical discharge machining 3 of the present embodiment, the electrode for electrical discharge machining 3 is preferably formed by being cut out from one plate or lump so that the discharge portions 1 and the support portion 2 may be formed not separately but integrally.

(2) Method for Manufacturing Electrode for Electrical Discharge Machining

Next, a method for manufacturing the electrode for electrical discharge machining of the present invention will be described.

As shown in FIGS. 2 and 3, the electrode for electrical discharge machining 3 of the present embodiment is preferably produced by grinding a plate member 43 for forming an electrode with a grind stone 41.

As shown in FIG. 2, the plate member 43 for forming an electrode is placed on a jig 42 whose surface is inclined. Then, the plate member 43 for forming an electrode is ground with the grind stone 41 which is in a state of standing perpendicularly (vertically) so that parts corresponding to the discharge portions and a part corresponding to the support portion may remain.

Thereafter, as shown in FIG. 3, the inclination of the surface of the jig 42 is changed so as to be line-symmetrical to the original inclination about the grind stone which is in the state of standing perpendicularly (the face that is ground with the grind stone) as a symmetrical axis. Then, in the state where the plate member 43 for forming an electrode is placed on the jig 42 with the changed inclination, the plate member 43 is ground with the grind stone 41 so that the part corresponding to the discharge portion has the "taper shape with the thick tip", thereby producing the electrode for electrical discharge machining 3 of the present invention.

The inclination of the jig 42 can be determined as appropriate so that the difference between the thickness T1 of the tip 4 of the obtained discharge portion 1 and the thickness T2 of the "end portion 5 on the side opposite to the tip 4" is a predetermined value (see FIG. 1). The initial inclination and the changed inclination of the jig 42 are preferably have the symmetrical relationship as described above, but are not necessarily required to have such a symmetrical relationship.

(3) Method for Manufacturing Honeycomb Structure Forming Die

Figure 4:
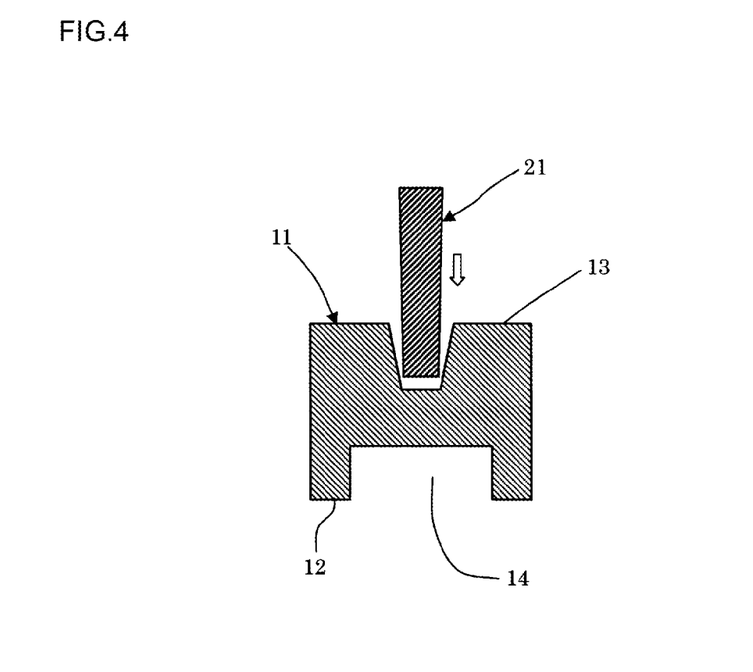
FIG. 4 is a schematic diagram that shows a state of processing a plate member by the electrode for electrical discharge machining for penetration processing in one embodiment of a method for manufacturing a honeycomb structure forming die of the present invention.
Figure 5:
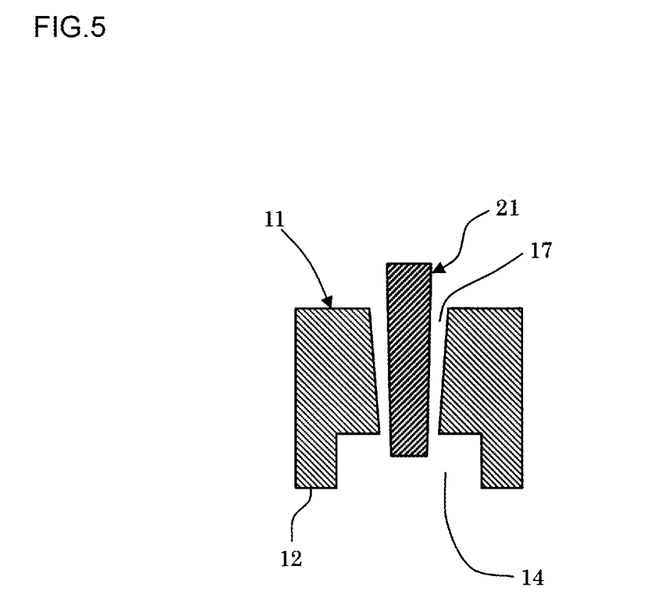
FIG. 5 is a schematic diagram that shows a state of processing the plate member by the electrode for electrical discharge machining for penetration processing in one embodiment of the method for manufacturing a honeycomb structure forming die of the present invention.
Figure 6:
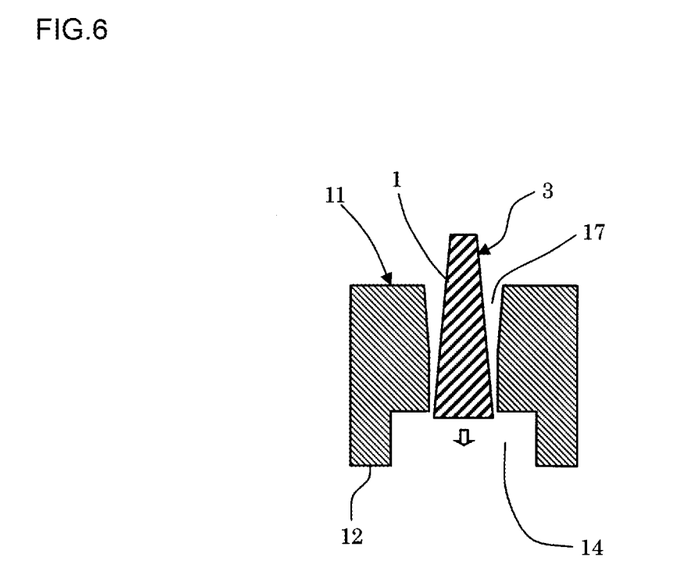
FIG. 6 is a schematic diagram that shows a state of processing the plate member by adopting one embodiment of the electrode for electrical discharge machining of the present invention in one embodiment of the method for manufacturing a honeycomb structure forming die of the present invention.
Figure 7:
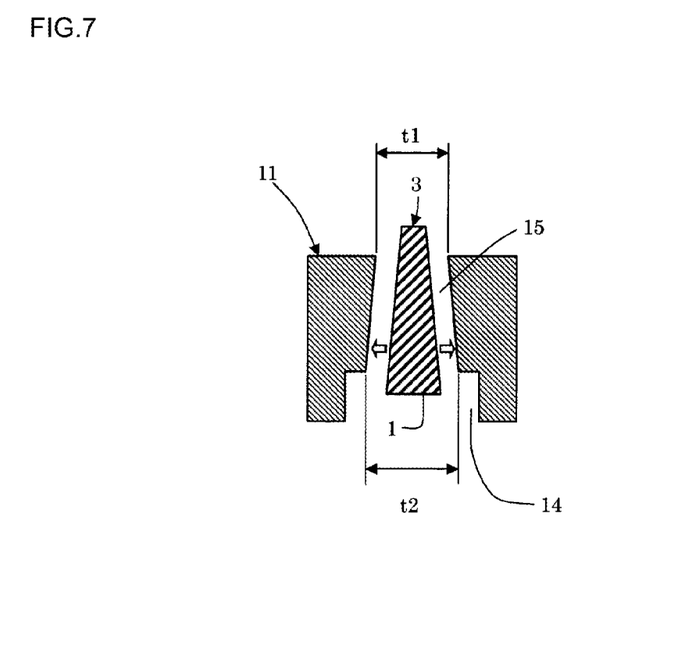
FIG. 7 is a schematic diagram that shows a state of processing the plate member by adopting one embodiment of the electrode for electrical discharge machining of the present invention in one embodiment of the method for manufacturing a honeycomb structure forming die of the present invention.

One embodiment of the method for manufacturing the honeycomb structure forming die of the present invention will be described. FIG. 4 is a schematic diagram that shows a state of processing a plate member 11 by an electrode for electrical discharge machining 21 for penetration processing in one embodiment of the method for manufacturing the honeycomb structure forming die of the present invention. FIG. 5 is a schematic diagram that shows a state of processing the plate member 11 by the electrode for electrical discharge machining 21 for penetration processing in one embodiment of the method for manufacturing a honeycomb structure forming die of the present invention. FIG. 6 is a schematic diagram that shows a state of processing the plate member 11 by adopting one embodiment of the electrode for electrical discharge machining of the present invention (the electrode for electrical discharge machining 3) in one embodiment of the method for manufacturing the honeycomb structure forming die of the present invention. FIG. 7 is a schematic diagram that shows a state of processing the plate member 11 by adopting one embodiment of the electrode for electrical discharge machining of the present invention (the electrode for electrical discharge machining 3) in one embodiment of the method for manufacturing the honeycomb structure forming die of the present invention.

The method for manufacturing the honeycomb structure forming die of the present embodiment has a back hole forming step and a slit forming step as shown in FIGS. 4 to 8. The back hole forming step is a step for forming plural back holes 14 which are opened on a back surface 12 side that is one face of the metal plate member 11. The slit forming step is a step for forming slits 15 which are opened on a front surface 13 side that is the other face of the metal plate member 11 and are in communication with the back holes 14 so as to produce the honeycomb structure forming die 16. In the slit forming step, firstly, slit-shaped through-holes 17, which are opened on the front surface 13 side and are in communication with the back holes 14, are formed in the plate member 11 by the electrode for electrical discharge machining 21 for penetration processing. Then, the electrode for electrical discharge machining of the present invention (the electrode for electrical discharge machining 3 for finishing processing) is subsequently inserted into the through-hole 17 while the electrode for electrical discharge machining discharges electricity. Thereafter, an inside of the through-hole 17 is processed by reciprocating the electrode for electrical discharge machining 3 for finishing processing in a direction of a thickness of the electrode for electrical discharge machining 3 while the electrode for electrical discharge machining 3 discharges electricity in the through-hole 17, whereby the slit 15 is formed so that an opening width of the through-hole 17 on the back hole 14 side may be increased more than an opening width of the through-hole 17 on the front surface side. Herein, the electrode for electrical discharge machining 21 for penetration processing includes the plural plate-shaped discharge portions and the plate-shaped support portion (the support portion of the electrode for electrical discharge machining 21 for penetration processing). The plate-shaped support portion is a plate to which the end portions of the plural "discharge portions of the electrode for electrical discharge machining 21 for penetration processing" on the side opposite to the tips are connected. In FIGS. 4 to 7, only the discharge portions are shown as the electrode for electrical discharge machining.

According to the method for manufacturing the honeycomb structure forming die of the present embodiment, since the honeycomb structure forming die is produced by using the electrode for electrical discharge machining of the present invention, a slit width (an opening width of the slit) on the front surface side can be formed to be smaller than a slit width (an opening width of the slit) on the back hole side.

As the metal plate member 11 that is used in the back hole forming step, a conventional plate member that is used for forming a die can be used. In the plate member 11, a part for forming the back hole and a part for forming the slit may be made of different materials. Also, the plate member 11 may be formed by affixing two metal plates together. In the case of affixing the two metal plates together, for example, after forming plural back holes (through-holes) in the one metal plate, the other metal plate may be affixed to a front surface of the one metal plate, and then, slits that are connected with the back holes may be formed on a front surface side of the other metal plate (on the front surface side of the plate member 11). At this time, the operation of "forming the back holes (the through-holes) in the one metal plate" corresponds to the "operation of forming the plural back holes that are opened on the back surface side of the plate member 11".

In the method for manufacturing the honeycomb structure forming die of the present embodiment, diameters, arrangements, intervals, depths and the like of the back holes formed in the plate member are not limited particularly, and desired values can be selected according to the purpose. The back holes can be formed by a known method. For example, the back holes can be formed by making holes in the plate member with a drill or the like.

In the slit forming step, as shown in FIGS. 4 and 5, the slit-shaped through-holes 17 which are opened on the front surface 13 side and are in communication with the back holes 14 are firstly formed in the plate member 11 by the electrode for electrical discharge machining 21 for penetration processing.

The electrode for electrical discharge machining 21 for penetration processing includes: the plural plate-shaped discharge portions; and the plate-shaped support portion to which the end portions of the plural discharge portions on the side opposite to the tips are connected. The plate-shaped discharge portion may be rectangular parallelepiped, but is usually exhausted by the use (discharge) so as to be changed into a taper shape with a thickness that is decreased toward the tip. In addition, the plate-shaped discharge portion may have a taper shape with a thickness that is increased toward the tip, but is not required to have such a shape because the plate-shaped discharge portion penetrates only the plate member.

In the slit forming step, as shown in FIG. 6, the discharge portion 1 of the electrode for electrical discharge machining of the present invention (the electrode for electrical discharge machining 3 for finishing processing) is subsequently inserted into the through-hole 17, while the discharge portion 1 discharges electricity.

Next, as shown in FIG. 7, the inside of the through-hole 17 is processed by reciprocating the discharge portion 1 of the electrode for electrical discharge machining 3 for finishing processing in a direction of a thickness of the discharge portion of the electrode for electrical discharge machining 3 while the discharge portion 1 discharges electricity in the through-hole 17. This processing is for increasing the opening width of the through-hole 17 on the back hole 14 side to be larger than the opening width of the through-hole 17 on the front surface side so as to form the slit 15. Herein, the reciprocating motion may be made once or plural times. Moreover, if reciprocating the discharge portion 1 in the direction of the thickness of the discharge portion 1 in the through-hole 17, since the discharge portion 1 has the "taper shape with the thickness that is increased toward the tip", the formed slit has a shape that an opening width t1 on the front surface side is narrow and an opening width t2 on the back hole side is wider than the opening width t1. Then, the opening width t1 of the slit on the front surface side and the opening width t2 of the slit on the back hole side are preferably set to be desired widths by the reciprocating motion of the discharge portion 1.

Figure 9:
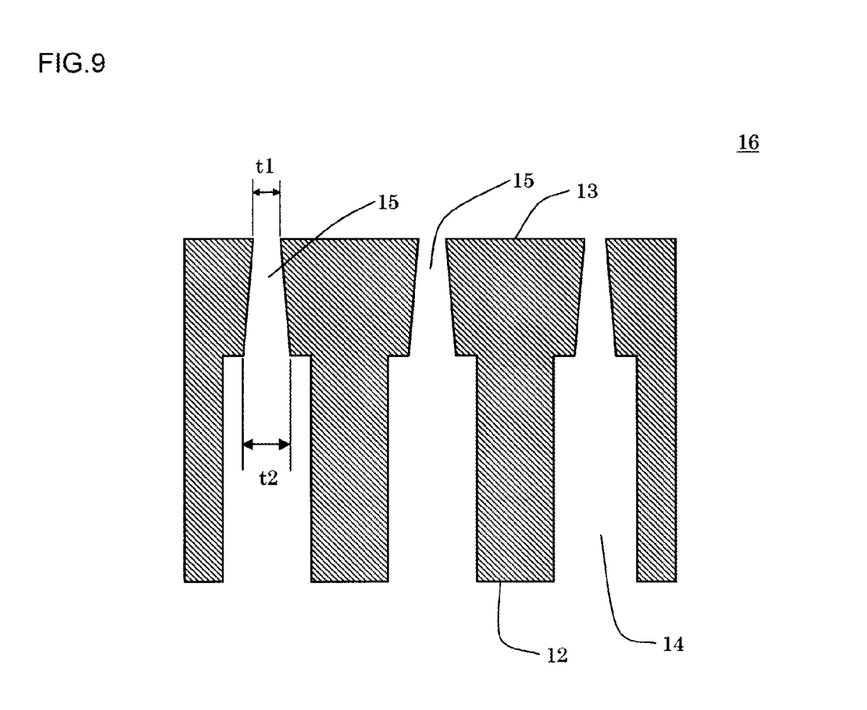
FIG. 9 is a schematic diagram that shows a cross-section taken along a line A-A' in FIG. 8.

On the die produced by the method for manufacturing a honeycomb structure forming die of the present embodiment, the slit 15 is preferably formed not in a continuously linear manner, as shown in FIGS. 8 and 9. That is, it is preferable that the slit 15 partly linear (in, for example, a part 31 of the slit 15), but its straight line is branched in the middle (folded along sides of the hexagon) and does not constitute a long continuous straight line. Further, this configuration can be also expressed that, for example, if the part 31 of the slit 15 is extended in a linear manner on the front surface of the die 16, the extended line passes through a "region 32 in which no slit is formed" on the front surface. In FIG. 8, a direction of extending the part 31 of the slit 15 in the linear manner is shown as an arrow X. The die 16 shown in FIGS. 8 and 9 is an example in which the shape formed of the slit 15 is a hexagon on the front surface 13 of the die 16. Moreover, the "part 31 of the slit 15" corresponds to one side of the hexagon. Also, on the front surface 13 of the die 16, the shape formed of the slits 15 may be a "combination of a square and an octagon". In the case of the hexagonal slit or the slit of the "combination of a square and an octagon", since the slits 15 are difficult to be formed in a linear manner by grinding work, the method for manufacturing a honeycomb structure forming die of the present invention is particularly effective.

EXAMPLES

Hereinafter, the present invention will be described more specifically by way of examples, but the present invention is not limited to these examples at all.

(1) Electrode for Electrical Discharge Machining (Example 1)

An electrode for electrical discharge machining 3, as shown in FIG. 1, including: plural plate-shaped discharge portions 1 with a thickness that was increased toward tips 4; and a plate-shaped support portion 2, to which end portions 5 of the plural discharge portions 1 on a side opposite to the tips 4 were connected, was produced. Specific processes will be described below.

A graphite substrate (a plate member for forming an electrode) of 200 mm×180 mm×50 mm was subjected to grinding work with a slicer. A method of the grinding work included firstly placing the plate member 43 for forming an electrode on a jig 42 whose surface was "inclined from the horizon by 0.30°" as shown in FIG. 2. Then, the plate member 43 for forming an electrode was ground with a grind stone 41 that was in a state of standing perpendicularly (vertically) so that parts corresponding to the discharge portions 1 and a part corresponding to the support portion remain.

Thereafter, as shown in FIG. 3, the inclination of the surface of the jig 42 was changed so as to be line-symmetrical to the original inclination about the grind stone in the state of standing perpendicularly (the face that was ground with the grind stone) as a symmetrical axis. That is, the surface of the jig 42 was rotated in an opposite direction around a rotational axis that is the same as a rotational axis of the initial inclination so as to change the inclination of the surface of the jig 42. Then, in the state where the plate member 43 for forming an electrode was placed on the jig 42 with the changed inclination, the plate member 43 was ground with the grind stone 41 so that the parts corresponding to the discharge portions become the discharge portions having the "taper shapes with the thick tips", thereby producing the electrode for electrical discharge machining 3.

The obtained electrode for electrical discharge machining 3 had a structure in which the discharge portions were arranged side by side longitudinally and transversely on a front surface of the support portion, as shown in FIG. 1. A shape of the tip (an end face) of the discharge portion was a rectangle with a width of 220 μm×a length of 1.0 mm. A difference between: the thickness of the tip of the discharge portion; and a thickness of an end portion of the discharge portion on a side opposite to the tip was 40 μm. A length of the discharge portion from the tip to the "end portion on the support portion side" was 3.5 mm. As distances between the discharge portions, a distance between "broad faces" of two of the discharge portions that faced each other (a distance in a longitudinal direction) was 1.7 mm, and a distance between side faces of two of the discharge portions that faced each other (a distance in a transverse direction) was 2.0 mm. The "broad faces" denotes a front surface and a back surface that are formed to be broad in each of the plate shapes, which are distinguished from long and narrow side faces. In addition, the "distance between "broad faces" that face each other" was considered as a distance between the adjacent "tips". Incidentally, the "broad faces" are the faces that are inclined to have taper shapes.

Comparative Example 1

An electrode for electrical discharge machining including: plate-shaped and rectangular parallelepiped discharge portions; and a plate-shaped support portion, to which end portions of the plural discharge portions on a side opposite to tips were connected, was produced. More specifically, the electrode for electrical discharge machining was produced in a method that is similar to that of Example 1, except for processing the plate member for forming an electrode in a state where a jig on which the plate member for forming an electrode was to be placed was kept horizontal.

The obtained electrode for electrical discharge machining had a shape similar to that of the electrode for electrical discharge machining of Example 1, except that the discharge portion was rectangular parallelepiped. A shape of a tip (an end face) of the obtained electrode for electrical discharge machining was the same as the shape of the tip (the end face) of the electrode for electrical discharge machining of Example 1.

(2) Manufacture of Honeycomb Structure Forming Die (Example 2)

Using the electrode for electrical discharge machining of Example 1, a honeycomb structure forming die "having a "shape of plural hexagons arranged adjacently" formed on its front surface by a slit open end" as shown in FIGS. 8 and 9 was produced. Specific processes will be described below.

Firstly, plural back holes which are opened on a back surface side that was one face of a metal plate member were formed (a back hole forming step). A material of the plate member was SUS630. Further, a shape of the plate member was a plate of 220 mm×220 mm×20 mm. A diameter of the back hole was 1.2 mm. Moreover, a depth of the back hole was 18 mm. As shown in FIG. 8, positions for forming the back holes were set to be overlapped with "alternate three apexes" among six apexes of the hexagon that was formed of the slits, on the front surface of the obtained die.

Next, as shown in FIGS. 4 and 5, slit-shaped through-holes 17, which were opened on a front surface 13 side and were in communication with the back holes 14, were formed in the plate member 11 by electrodes for electrical discharge machining 21 for penetration processing. As the electrodes for electrical discharge machining for penetration processing, electrodes for electrical discharge machining with the same structure as those of Comparative Example 1 were used. The totally five electrodes for electrical discharge machining for penetration processing were used, because they were exhausted due to electric discharge. Herein, one electrode for electrical discharge machining was counted as "one".

Then, as shown in FIG. 6, the electrode for electrical discharge machining of the present invention (the electrode for electrical discharge machining 3 for finishing processing) was inserted into the through-hole 17, while the electrode for electrical discharge machining discharges electricity.

Thereafter, as shown in FIG. 7, an inside of the through-hole 17 was processed by reciprocating the electrode for electrical discharge machining 3 for finishing processing in a direction of a thickness of the electrode for electrical discharge machining 3 while the electrode for electrical discharge machining 3 discharged electricity in the through-hole 17. Thereby, a slit 15 was formed so that an opening width t2 of the through-hole 17 on a back hole 14 side was larger than an opening width t1 of the through-hole 17 on a front surface side, thereby obtaining a honeycomb structure forming die. Only one electrode for electrical discharge machining 3 for finishing processing was used.

Figure 10:
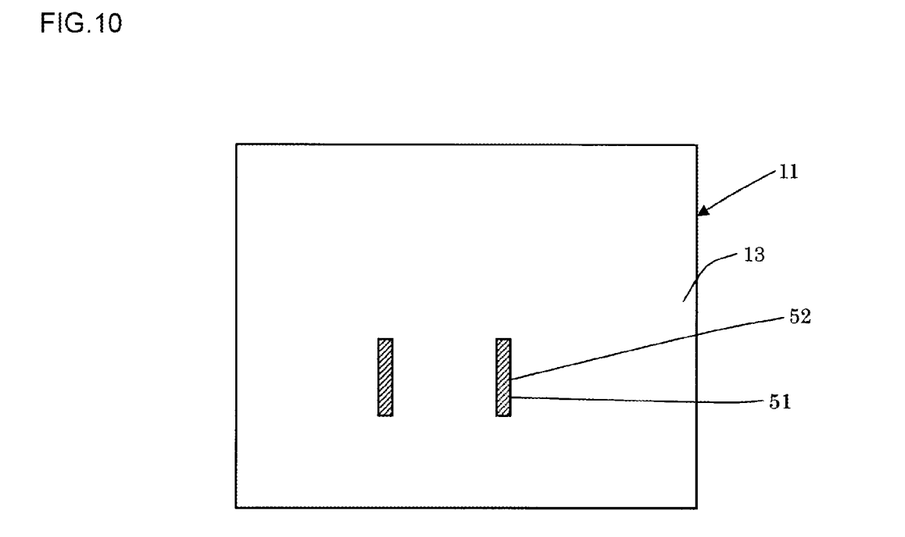
FIG. 10 is a plan view that schematically shows a part of procedures for forming slits so as to draw hexagons on a front surface of the plate member by using the electrode for electrical discharge machining of the present invention in one embodiment of the method for manufacturing a honeycomb structure forming die of the present invention.

As described above, on the front surface 13 of the plate member 11, a slit shown in FIG. 10 (a partial slit 51) was formed. The slit 15 in FIG. 7 corresponds to the partial slit 51 in FIG. 10. FIG. 10 schematically shows a part of the state in which the slits were formed in the plate member. The partial slit 51 corresponded to a "side" of the hexagon, and by further adding the partial slits 51 as described below (see FIGS. 11 to 15), the hexagon was formed on the front surface 13 of the plate member 11. Incidentally, the "partial slit" means to constitute a "part" of the hexagon.

Figure 11:
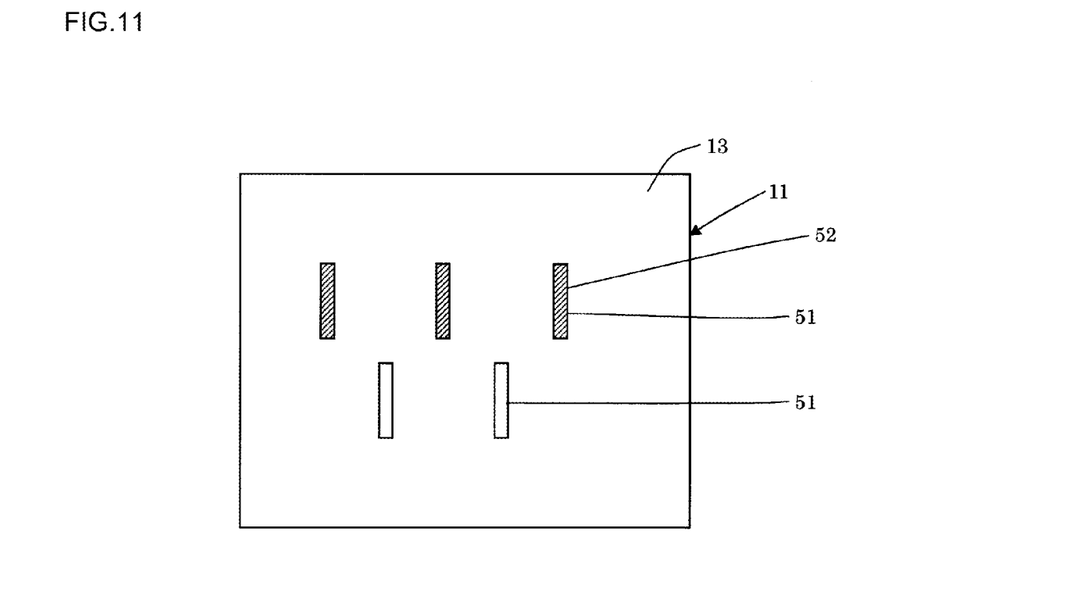
FIG. 11 is a plan view that schematically shows a part of procedures for forming the slits so as to draw the hexagons on the front surface of the plate member by using the electrode for electrical discharge machining of the present invention in one embodiment of the method for manufacturing a honeycomb structure forming die of the present invention.

Next, a "newly formed partial slit 52" shown in FIG. 11 was formed in the same method as that of manufacturing the partial slit 51 shown in FIG. 10. In FIGS. 11 to 15, the partial slit 51 with oblique lines is the "newly formed partial slit 52". Incidentally, the partial slit 51 in FIG. 10 is also newly formed, and thus applies for the "newly formed partial slit 52" as well. At this time, five electrodes for electrical discharge machining for penetration processing were used, and one electrode for electrical discharge machining 3 for finishing processing was used.

Figure 12:
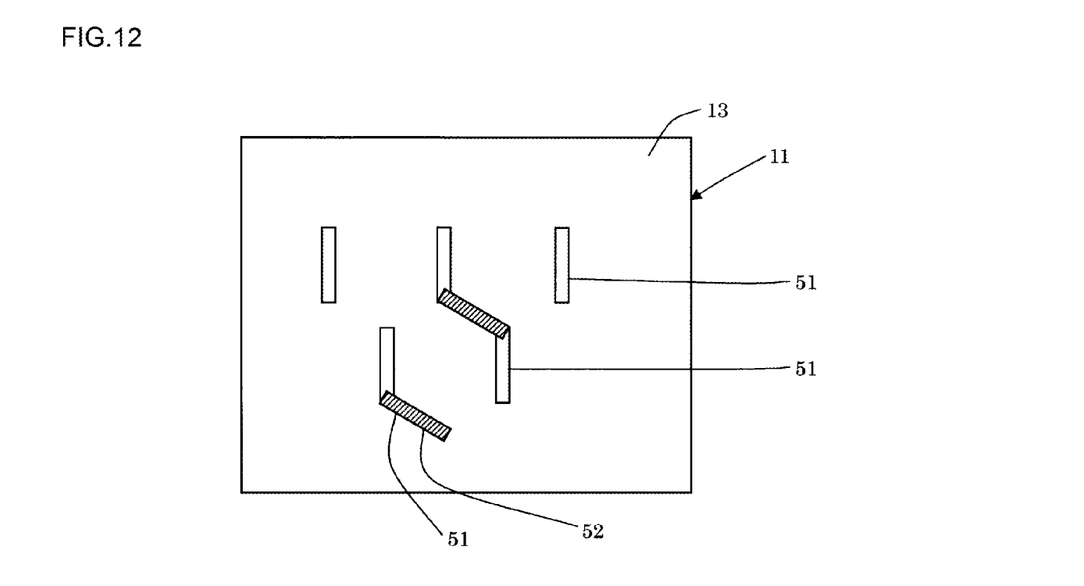
FIG. 12 is a plan view that schematically shows a part of the procedures for forming the slits so as to draw the hexagons on the front surface of the plate member by using the electrode for electrical discharge machining of the present invention in one embodiment of the method for manufacturing a honeycomb structure forming die of the present invention.

Next, a "newly formed partial slit 52" inclined by 60°, which is shown in FIG. 12, was formed in the same method as that of manufacturing the partial slit 51 shown in FIG. 10. At this time, two and a half electrodes for electrical discharge machining for penetration processing were used, and one electrode for electrical discharge machining 3 for finishing processing was used.

Figure 13:
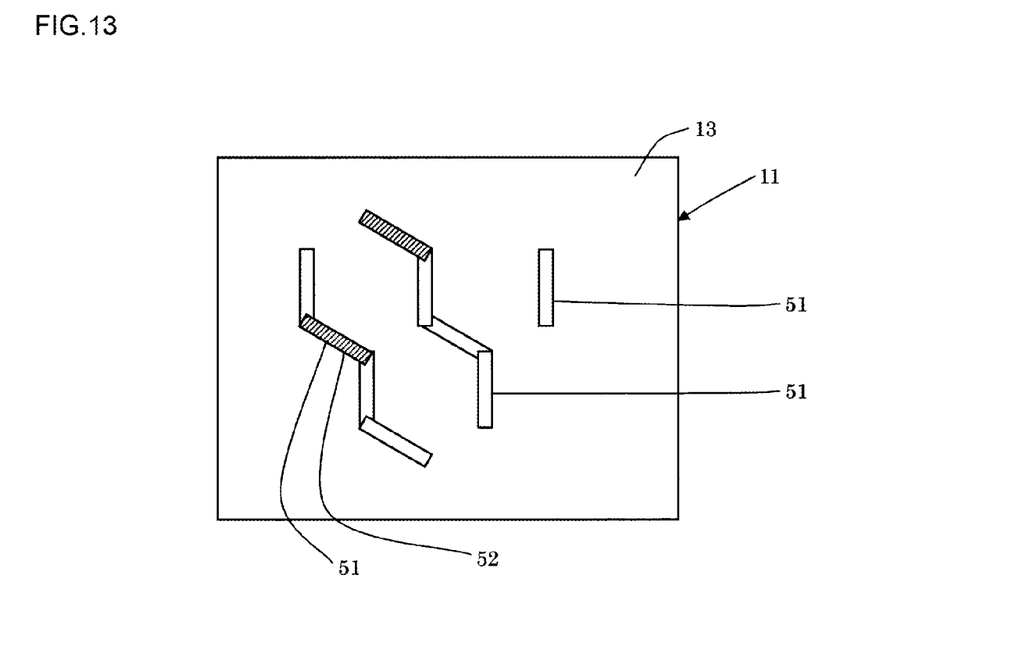
FIG. 13 is a plan view that schematically shows a part of the procedures for forming the slits so as to draw the hexagons on the front surface of the plate member by using the electrode for electrical discharge machining of the present invention in one embodiment of the method for manufacturing a honeycomb structure forming die of the present invention.

Then, a "newly formed partial slit 52" inclined by 60°, which is shown in FIG. 13, was formed in the same method as that of manufacturing the partial slit 51 shown in FIG. 10. At this time, two and a half electrodes for electrical discharge machining for penetration processing were used, and one electrode for electrical discharge machining 3 for finishing processing was used.

Figure 14:
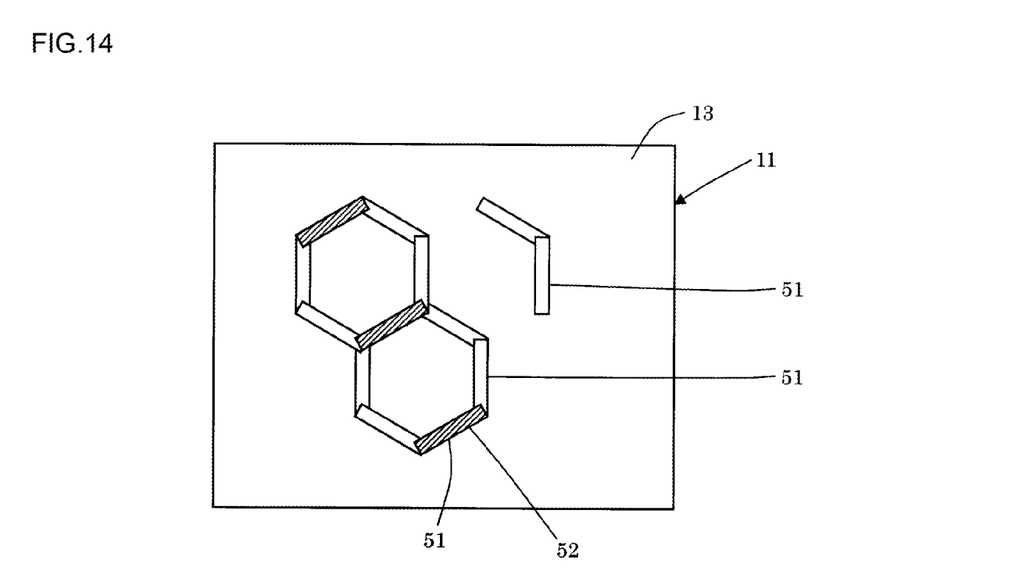
FIG. 14 is a plan view that schematically shows a part of the procedures for forming the slits so as to draw the hexagons on the front surface of the plate member by using the electrode for electrical discharge machining of the present invention in one embodiment of the method for manufacturing a honeycomb structure forming die of the present invention.

Thereafter, a "newly formed partial slit 52" inclined by 120°, which is shown in FIG. 14, was formed in the same method as that of manufacturing the partial slit 51 shown in FIG. 10. At this time, two and a half electrodes for electrical discharge machining for penetration processing were used, and one electrode for electrical discharge machining 3 for finishing processing was used.

Figure 15:
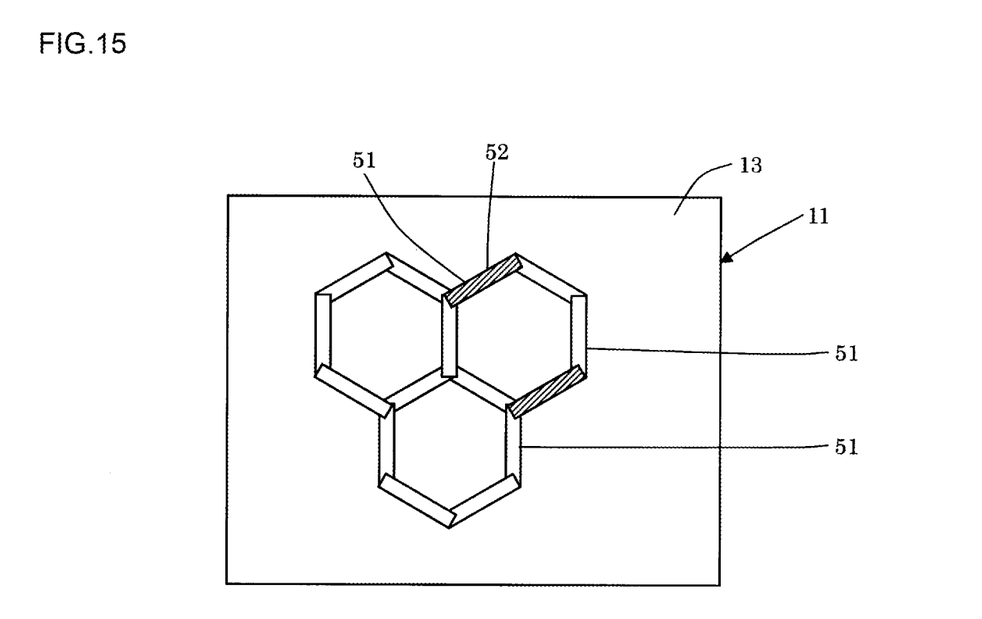
FIG. 15 is a plan view that schematically shows a part of the procedures for forming the slits so as to draw the hexagons on the front surface of the plate member by using the electrode for electrical discharge machining of the present invention in one embodiment of the method for manufacturing a honeycomb structure forming die of the present invention.

Subsequently, a "newly formed partial slit 52" inclined by 120°, which is shown in FIG. 15, was formed in the same method as that of manufacturing the partial slit 51 shown in FIG. 10. Thereby, a hexagon was formed of open ends of the slits on the front surface of the plate member, thereby obtaining a die. At this time, two and a half electrodes for electrical discharge machining for penetration processing were used, and one electrode for electrical discharge machining 3 for finishing processing was used.

Twenty electrodes for electrical discharge machining for penetration processing were required for the production of the die. Further, six electrodes for electrical discharge machining for finishing processing were required for the production of the die. Moreover, the processing time of the slits was about 640 hours.

An opening width of the slit on the front surface side of the obtained die was 200 μm. Further, an opening width of the slit on the back hole side was 280 μm. One side of the regular hexagon that was formed so as to be surrounded by the slits on the front surface of the die was 1.0 mm. A depth of the slit (a distance from the open end on the front surface side to an open end on the back hole side) was 3.0 mm.

Comparative Example 2

Using the electrode for electrical discharge machining of Comparative Example 1, a honeycomb structure forming die "having a "shape of plural hexagons arranged adjacently so as to interpose the slit open ends" formed on its front surface" was produced as shown in FIGS. 8 and 9. More specifically, the honeycomb structure forming die was produced in the method of Example 2 by using the electrode for electrical discharge machining of Comparative Example 1. At this time, the electrode for electrical discharge machining of Comparative Example 1 was used both as an electrode for electrical discharge machining for penetration processing and an electrode for electrical discharge machining for finishing processing. Moreover, twenty electrodes for electrical discharge machining for penetration processing were required for the production of the die. Further, twelve electrodes for electrical discharge machining for finishing processing were required for the production of the die. While performing the finishing processing by using the electrodes for electrical discharge machining for finishing processing, the two electrodes for electrical discharge machining for finishing processing were required in one "operation of forming the partial slit". The reason for this is because the one electrode for electrical discharge machining for finishing processing was used for increasing the width of the through-hole that was formed by the electrodes for electrical discharge machining for penetration processing, and the other one electrode for electrical discharge machining for finishing processing was used for being further inserted into the widened through-hole and reciprocated in a thickness direction so as to perform the finishing. Moreover, the processing time of the slits was about 760 hours.

Furthermore, the "opening width of the slit on the front surface side" of the die produced in Example 2 and an "opening width of the slit on a front surface side" of the die produced in Comparative Example 2 were set to be the same.

It can be realized that, from the respective results of Example 2 and Comparative Example 2, the processing time of the slits in Example 2 was decreased to be significantly shorter than the processing time of the slits in Comparative Example 2.

INDUSTRIAL APPLICABILITY

The electrode for electrical discharge machining of the present invention can be preferably used for producing a die for producing a ceramic honeycomb structure (the honeycomb structure forming die). Further, according to the method for manufacturing a honeycomb structure forming die of the present invention, the die for producing a ceramic honeycomb structure can be produced.

DESCRIPTION OF REFERENCE NUMERALS

1: discharge portion, 2: support portion, 3: electrode for electrical discharge machining, 4: tip, 5: end portion on side opposite to tip, 11: plate member, 12: back surface (one face), 13: front surface (other face), 14: back hole, 15: slit, 16: die (honeycomb structure forming die), 17: through-hole, 21: electrode for electrical discharge machining for penetration processing, 31: part of slit, 32: region in which no slit is formed, 41: grind stone, 42: jig, 43: plate member, L: length of discharge portion, M: length of tip, T1: thickness of tip, T2: thickness of end portion on side opposite to tip, t1: opening width on front surface side, t2: opening width on back hole side, X: arrow.

The invention claimed is:

1. An electrode for electrical discharge machining for manufacturing a honeycomb structure forming die, comprising:
    plural plate discharge portions having a linear increasing thickness that continuously extends from end portions at one end of the plural plate discharge portions to tips at another end of the plural plate discharge portions, such that the thickness of the end portions is less than the thickness of the outermost exposed edge of the tips of the plural plate discharge portions, which are parallel with each other; and
    a plate support portion to which the end portions of the plural plate discharge portions on a side opposite to the tips are connected, wherein the plural plate discharge portions and the plate support portion are formed integrally.

2. The electrode for electrical discharge machining according to claim 1, wherein a difference between a thickness of each tip of the discharge portions and a thickness of each end portion of the discharge portions on the side opposite to each of the tips of the discharge portions ranges from 5 µm to 500 µm.

3. The electrode for electrical discharge machining according to claim 1, wherein a thickness of each tip of the discharge portions ranges from 50 µm to 1000 µm.

4. The electrode for electrical discharge machining according to claim 2, wherein a thickness of each tip of the discharge portions ranges from 50 µm to 1000 µm.

5. The electrode for electrical discharge machining according to claim 1, wherein the plate discharge portions are arranged at an interval in a width direction.

6. The electrode for electrical discharge machining according to claim 4, wherein the plate discharge portions are arranged at an interval in a width direction.

7. The electrode for electrical discharge machining according to claim 1, wherein each of the plural plate discharge portions has a plate shape having a taper shape with the tip thereof thicker than the end portion thereof opposite to the tip.

8. A method for manufacturing a honeycomb structure forming die, comprising:
    a back hole forming step for forming plural back holes which are opened on a back surface side that is one face of a metal plate member; and
    a slit forming step for forming slits which are opened on a front surface side that is the other face of the metal plate member and are in communication with the back holes so as to produce a honeycomb structure forming die, wherein
    the slit forming step includes: forming slit-shaped through-holes, which are opened on the front surface side and are in communication with the back holes, in the plate member by an electrode for electrical discharge machining for penetration processing;
    subsequently inserting the discharge portions of the electrode for electrical discharge machining according to claim 1 into the through-holes while the discharge portions discharge electricity; and
    thereafter processing inside of the through-holes by reciprocating the discharge portions of the electrode for electrical discharge machining in a direction of each thickness of the discharge portions while the discharge portions discharge electricity in the through-holes, to form the slits in which each opening width of the slits on the back hole side is larger than each opening width of the through-holes on the front surface side.

9. The method for manufacturing a honeycomb structure forming die according to claim 8, wherein the slits are formed not in a continuous linear manner on the front surface of the honeycomb structure forming die.

10. The method for manufacturing a honeycomb structure forming die according to claim 9, wherein a shape formed of the slits on the front surface of the honeycomb structure forming die is a hexagon or a combination of a square and an octagon.

11. A method for manufacturing a honeycomb structure forming die, comprising:
- a back hole forming step for forming plural back holes which are opened on a back surface side that is one face of a metal plate member; and
- a slit forming step for forming slits which are opened on a front surface side that is the other face of the metal plate member and are in communication with the back holes so as to produce a honeycomb structure forming die, wherein
- the slit forming step includes: forming slit-shaped through-holes, which are opened on the front surface side and are in communication with the back holes, in the plate member by an electrode for electrical discharge machining for penetration processing;
- subsequently inserting the discharge portions of the electrode for electrical discharge machining according to claim 4 into the through-holes while the discharge portions discharge electricity; and
- thereafter processing inside of the through-holes by reciprocating the discharge portions of the electrode for electrical discharge machining in a direction of each thickness of the discharge portions while the discharge portions discharge electricity in the through-holes, to form the slits in which each opening width of the slits on the back hole side is larger than each opening width of the through-holes on the front surface side.

12. The method for manufacturing a honeycomb structure forming die according to claim 11, wherein the slits are formed not in a continuous linear manner on the front surface of the honeycomb structure forming die.

13. The method for manufacturing a honeycomb structure forming die according to claim 12, wherein a shape formed of the slits on the front surface of the honeycomb structure forming die is a hexagon or a combination of a square and an octagon.

* * * * *